July 22, 1969   E. C. HERBKERSMAN   3,456,956
SELF-ADJUSTING CLAMPING CHUCK
Filed July 23, 1965   3 Sheets-Sheet 2

INVENTOR.
Carle C. Herbkersman,
BY
John H. Leonard,
his ATTORNEY.

July 22, 1969   E. C. HERBKERSMAN   3,456,956
SELF-ADJUSTING CLAMPING CHUCK
Filed July 23, 1965   3 Sheets-Sheet 3

INVENTOR.
Earle C. Herbkersman,
BY John H. Leonard,
His ATTORNEY.

_United States Patent Office_ 3,456,956
Patented July 22, 1969

3,456,956
SELF-ADJUSTING CLAMPING CHUCK
Earle C. Herbkersman, Parma, Ohio, assignor to The Pipe Machinery Company, Wickliffe, Ohio, a corporation of Ohio
Filed July 23, 1965, Ser. No. 474,423
Int. Cl. B23b *31/30, 31/10, 5/22*
U.S. Cl. 279—4                7 Claims

ABSTRACT OF THE DISCLOSURE

The preferred form of self-adjusting clamping chuck of the present disclosure comprises a body in which a plurality of radially movable clamping jaws are arranged about a central axis for movement toward and away from the axis, thereby defining a throat for receiving a length of pipe. Each jaw is driven by an individual piston and cylinder assemblage which, upon introduction of fluid pressure moves the jaw into light pressure contact with the pipe. The assemblages are connected in parallel. When fluid pressure is admitted to them they extend, and each moves its associated jaw toward the pipe independently of the other jaws—until its jaw engages, and has its movement arrested by, the pipe. As a result, the jaws may move different distances but they engage the pipe with equal pressure. This pressure is so light that it does not distort the pipe cross section originally presented to the jaws. After all of the jaws have thus lightly gripped the pipe, each of the piston and cylinder assemblages is self-locked hydraulically in its particular extended condition. A common annular piston is mechanically connected to all of the assemblages and while the assemblages are in self-locked condition, the annular piston applies equal force to all of the assemblages and moves them equidistantly concurrently from their original positions of engagement with the pipe for applying pressure to the pipe about the periphery of the cross section.

---

This invention relates to a self-adjusting chuck having jaws which float relative to each other and to their common support under light yielding pressure so as to be moved into self-adjusting contact with a length of stock, and which are then moved concurrently substantially equidistantly from their self-adjusted contact positions under much higher clamping pressures so as to grip the stock firmly and hold it in position for machining.

For purposes of illustration, the chuck is described herein as holding a length of pipe for external threading, its use for holding pipe couplings and other stock for external and internal threading and other machining operations being apparent from the illustrative example.

It sometimes happens that the end portions of a pipe which is to be threaded is slightly out-of-round or is bowed or bent endwise so that the longitudinal axis is slightly curvilinear or bent. The present chuck is designed so that its jaws grip such a pipe near the end portion to be threaded regardless of the out-of-roundness or endwise curvature while the end portion is positioned in coaxial relation to the axis of rotation of a rotary head threading machine, and hold the pipe firmly in position with the gripping pressure applied by each jaw equal to that of each other jaw. Thus the present chuck may be used as a mere gripping chuck for proper gripping of out-of-round pipe, or as a floating chuck, or both.

Generally, the operation is one in which the jaws individually adjust themselves under light yielding pressure to the surface of the pipe while the pipe is held in a predetermined position by extraneous devices, and, having adjusted themselves, become self-locking with respect to a common mechanical driving member which moves them concurrently under nonyielding heavy clamping pressure radially of the chuck axis equidistantly from their adjusted starting positions.

Various specific objects and advantages of the invention will become apparent from the following description wherein reference is made to the drawings in which.

For purposes of illustration, the chuck is shown as a roll-over type of chuck supported as disclosed in my United States Letters Patent No. 3,083,024, issued Mar. 26, 1963, its use as a stationary chuck for compensating for out-of-roundness and curvature, or as a floating chuck for centering or both, being apparent from the illustrative example.

Figure 1:
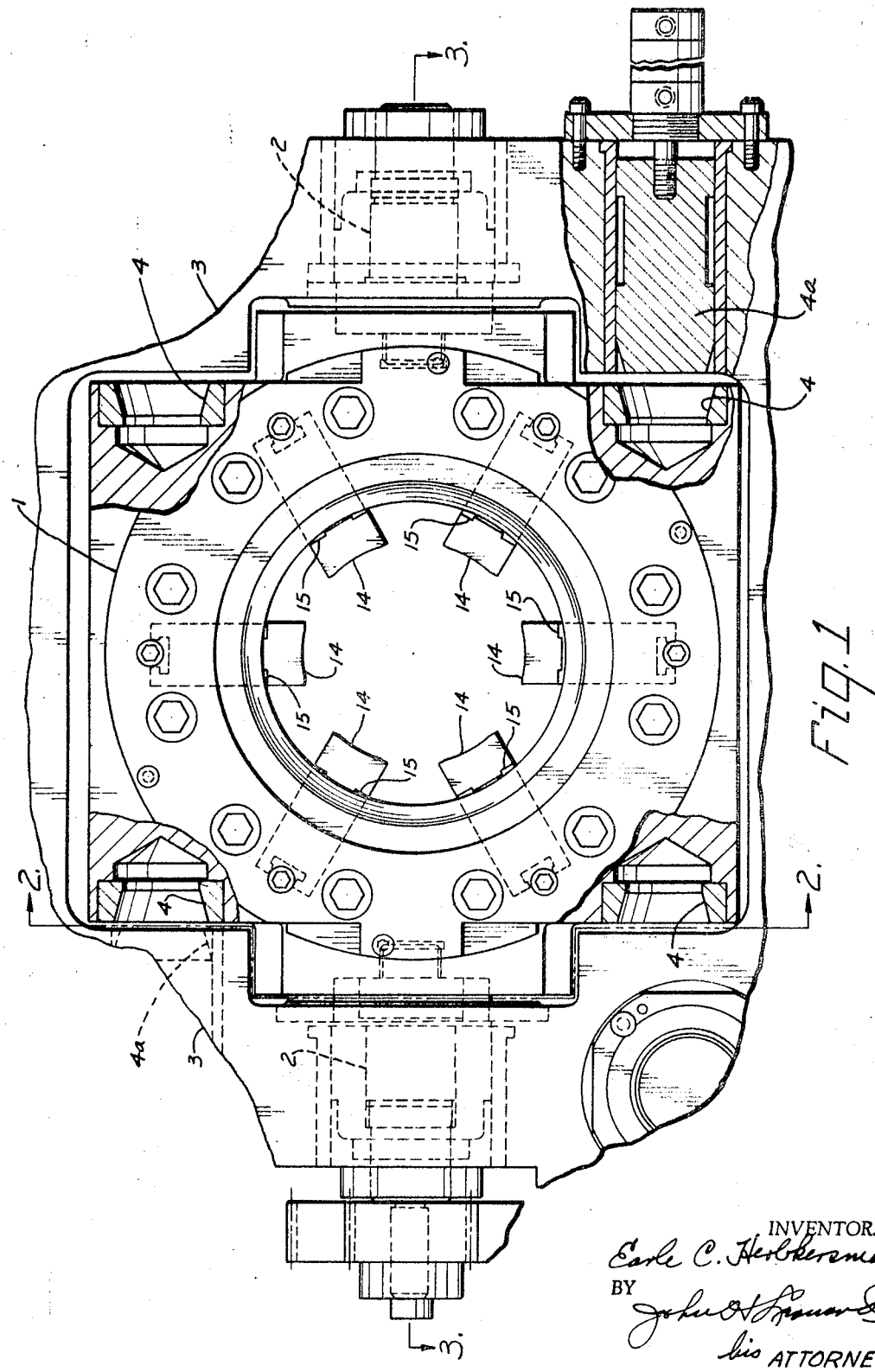
FIG. 1 is a front elevation of the chuck and a portion of its supporting structure.
Figure 2:
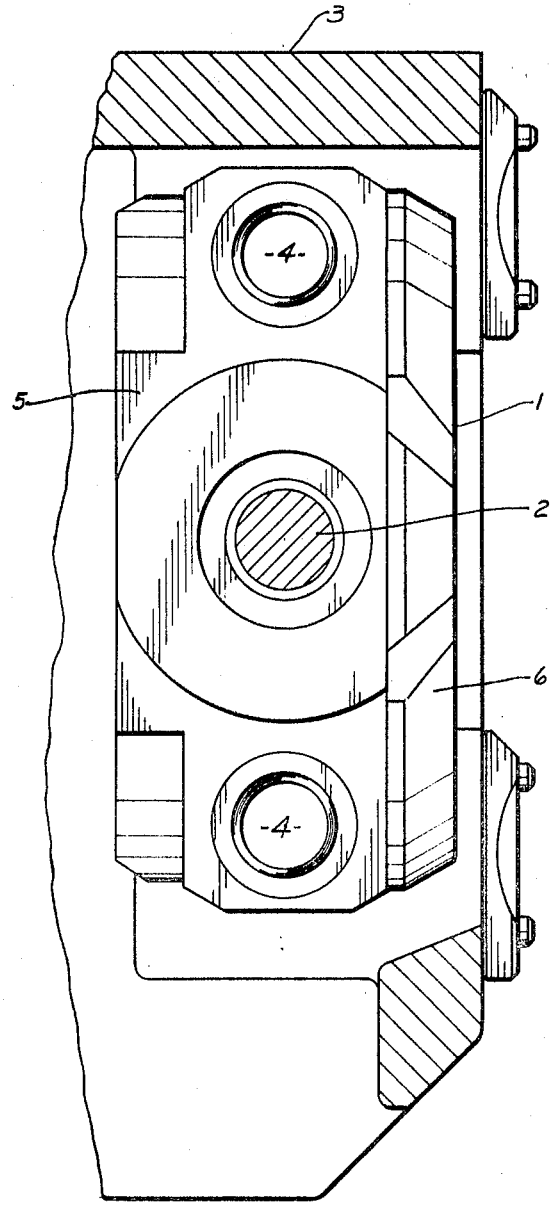
FIG. 2 is a fragmentary side elevation of the chuck, and part of its supporting structure, and is taken on the line 2—2 in FIG. 1.
Figure 3:
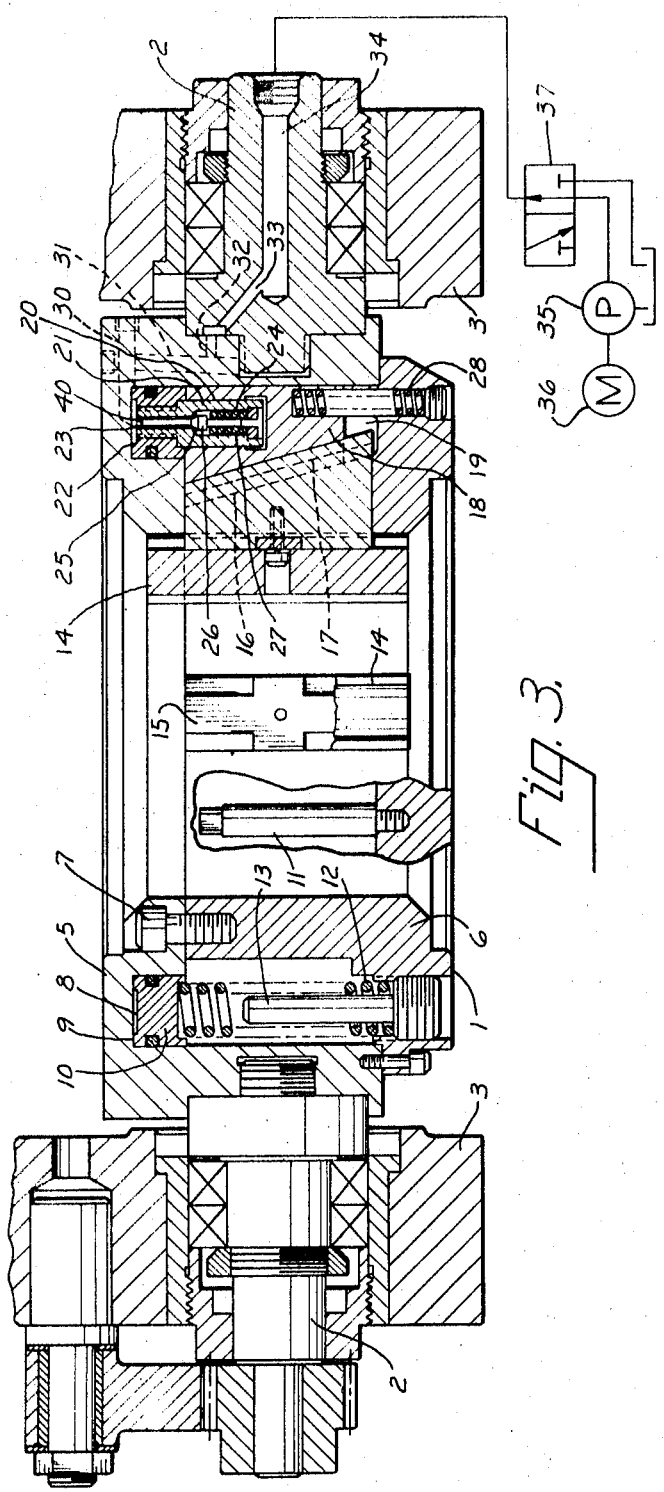
FIG. 3 is a horizontal sectional view taken on the line 3—3 in FIG. 1.

Referring first to FIG. 1, the chuck comprises a body 1 supported on horizontal trunnions 2 in a supporting frame 3 for rotation about a horizontal axis so as to dispose first one end and then the other of the chuck forwardly. Such a chuck facilitates the successcive machining or threading of opposite ends of a pipe coupling by a single machine.

The body 1 is provided with suitable sockets 4 into which laterally driven lock pins 4a are directed for locking the chuck in proper position with its axis horizontal and coincident with the axis of the spindle machine with which it is to be associated. This supporting structure is necessary when the chuck is used in the combination shown in the above patent, but the body 1 may be supported fixedly in position when used in other combinations.

This roll over feature is fully disclosed in the above identified patent and forms no part of the present invention.

Referring to the chuck proper, the body 1 is a composite structure comprising an annular shell 5 and a complementary shell 6, the shell 5 forming one end and the sides of the body and the shell 6 forming the remainder of the body. The shells are suitably bolted together rigidily by bolts 7.

An annular piston and cylinder assemblage indicated generally at 8, is mounted in the body 1 and comprises an annular cylinder 9 and an annular piston 10 reciprocable therein axially of the body 1. The shell 6 carries a suitable stop 11 which limits the axial movement of the piston 10 in the advancing or forward direction. Return springs 12 are provided for returning the piston 10 to starting position.

The springs 12 are distributed about the axis of the piston 10 and are held in thep roper cooperative relation with respect to the piston 10 by fingers 13 which are rigid with the shell 6.

Mounted within the body for movement radially thereof are a plurality of circumferentially distributed gripping jaws 14, which may be of the detachable type, such as disclosed in my United States Letters Patent No. 3,083,025, issued Mar. 26, 1963. Each jaw 14 is mounted on a jaw carrier 15 which is guided for radial reciprocation independently of the other carriers 15 by suitable radial guide slots in the shells 5 and 6. Each carrier 15 is provided with a wedge slot 16 which is adapted to receive a complementary wedge surface 17 on an associated wedge block 18. The blocks 18 are suitably mounted in the body in guideways 19 for movement parallel to the axis of the body individually of each other. Thus the carriers 15 with their wedge slots 16 connected to the complementary surfaces 17 on the blocks 18 provide means for advancing and retracting the jaws individually with respect to each other.

The wedge blocks 18 are operable when moved in one direction to advance the jaws 14 towards the axis of the chuck and when returned in the opposite direction to retract the jaws 14 from the axis.

As hereinbefore mentioned, it is desirable that self-adjusting means be provided for moving each jaw independently of the other jaws under relatively light pressure so as to seat it against the outer surface of a piece of pipe positioned in the chuck throat even when the surface is out-of-round or is curved slightly endwise, or both.

As one embodiment of an adjusting means, each of the wedge blocks 18 is provided with a cylinder bore 20 in which a piston 21 is reciprocable. The piston 21 has a reduced shank portion or rod 22 by which it is fixedly connected to the piston 10 for movement axially therewith. The piston and cylinder assemblages thus provided are arranged one for each wedge block 18 and each assemblage is operable independently of the others. The rod 22 of each piston is provided with a central bore 23. The piston itself is provided with a central bore 24 communicating with the bore 23 and of larger diameter than the bore 23, thus providing a valve seat 25 between the inner ends of the bores 23 and 24. A check valve 26 is normally seated on the seat 25 by means of a spring 27, but can be unseated by fluid pressure fed into the bore 23. The spring 27 is so chosen that a very light fluid pressure will unseat the valve 26.

When the valve 26 is unseated by pressure fluid entering the bore 23, the fluid flows through the bore 24 and enters the cylinder 20, thus driving the wedge block 18 in the forward direction. A spring 28 is provided for returning the wedge block 18 in the opposite direction when the fluid pressure is released.

The shell or body portion 5 has a duct 30 which is connected with the cylinder 9 and with interconnecting ducts 31 and 32 which communicate through ducts 33 and 34 in the trunnion with a source of pressure fluid. The pressure fluid may be supplied by a suitable pump 35 driven by a motor 36, the supply being controlled by a suitable reversing valve 37. The specific manner of feeding pressure fluid to the cylinder 9 forms no part of the present invention.

It is apparent that with the structure thus far described, with the pump 35 operated to supply fluid under light pressure through the valve 37, this pressure fluid first passes into the cylinder 9 behind the piston 10. The springs 12 of the piston 10 are of sufficient strength relative to the springs 27 which seat the check valves 26 that the piston 10 is retained in a starting or fully retracted position and the pressure fluid passes through the bores 23, unseats the valves 26 and passes into the cylinders 20, and moves the wedge blocks 18 forwardly. Since the cylinder 9 connects all of the bores 23 in parallel, the movement of the blocks 18 continues until the jaws of all of the blocks engage under light pressure with a pipe in the chuck throat. This pressure is so slight that it does not disturb the setting of the pipe or indent it, or apply force to it in any way which might tend to distort it radially. So long as any one of the jaws is out of engagement with the pipe the venting of pressure fluid from the cylinder 9 into such one of the cylinders 20 causes the pressure in the cylinder 9 to remain below line pressure.

Due to the parallel connection of the bores 23, as each jaw 14 accommodates itself against the pipe, its wedge block 18 ceases to move in the wedging direction. When all jaws 14 are seated lightly against the pipe, the pressure within the cylinders 20 equalizes and the flow of pressure fluid into the cylinders 20 ceases. When this flow ceases, the unit pressure in the cylinder 9 almost instantly builds up to line pressure. Thereupon, since the area of the annular piston 10 is much larger than the combined areas of the inner ends of the pistons 21, the total force acting on the piston 10 and urging it toward the blocks 18 is much greater than the total of the forces acting on the inner ends of all of the pistons 21 plus the force of the springs 12. Consequently, the piston 10 starts to move toward the blocks 18. During its initial movement a small part of the fluid in the cylinders 20 is forced back through the ducts in the pistons 21 to the cylinder 9 due to the movement of the pistons 21 further into the cylinders 20 by the piston 10. Thereupon, the check valves 26 close and hydraulically lock the blocks 18 against return in the direction opposite from the wedging direction in which they were driven by the pressure fluid introduced into the cylinders 20. The fluid pressure acting on the small pistons 21 is inadequate to move the blocks 18 against even a light resistance of the pipe to movement of the jaws 14. However, when the jaws are thus seated and the valves 26 are closed, the pressure fluid becomes effective on the much larger area of the annular piston 10 and drives it forwardly against the resistance of its compression springs 12. Due to the hydraulic interlock between the blocks 18 and the piston 21 by the fluid in the cylinders 20, the pistons 21 and cylinders 20 acts as rigid compression members and moves all blocks 18 concurrently in fixed relation to the main piston 10 equidistantly in the wedging direction from the positions into which the blocks had been moved by the initial light seating pressure of the fluid in the cylinders 20. Thus the jaws are first floated individually into engagement with the pipe under light pressure and thereafter are driven concurrently equidistantly by a common mechanical driving member, the piston 10, with equalized pressure greater than the initial light pressure. Thereby they all move at the same rate of speed toward the pipe axis and clamp the pipe concurrently at spaced locations about its periphery, with exactly the same amount of movement from the positions in which they first initially engaged the pipe.

Upon release of the fluid pressure in the duct 34, the return springs 12 operate to return the main piston 10 to starting position, carrying with it, of course, the pistons 21, and followed by the blocks 18 in their relatively extended positions.

However, it is desired that the blocks 18 return to their starting position relative to the main piston 10. For this purpose, releasing pins 40 are mounted on the inner wall of the shell 5, and extend through the bores 23 in radially spaced relation to the side walls thereof. If desired, the pins 40 may be guided by engagement with the walls of the bores 23 and be provided with longitudinal grooves to permit the passage of fluid between the pins 40 and the walls of the bore 23. The pins 40 are of such length that when the main actuator or piston 10 and block 18 have been returned as a unit almost to the starting position of the piston 10 by the springs 12 and 28, the pins 40 engage the valves 26 and unseat them sufficiently so that the fluid can be returned from the cylinders 20 back through the bore 23 by the reactionary or return force of the return springs 28.

It is apparent from the foregoing description that this particular chuck may be used as a roll-over chuck for couplings, as described in the identified Patent No. 3,083,024, or it may be used as a floating chuck, as described in U.S. Letters Patent No. 3,153,250, issued to Donn W. Muelhauser, Oct. 20, 1964, wherein the support on which the jaws are carried floats to adjust to the proper centering position and the jaws move in unison relative to the support.

However, such is not necessary in the present chuck wherein the jaw support need not float, but, instead, the jaws themselves float individually relative to their support. This greatly simplifies the arrangement of chucks for handling out-of-round pipe and pipe with curved axes, as discussed in U.S. Patent No. 3,153,250 and as disclosed herein in connection with FIG. 4.

Figure 4:
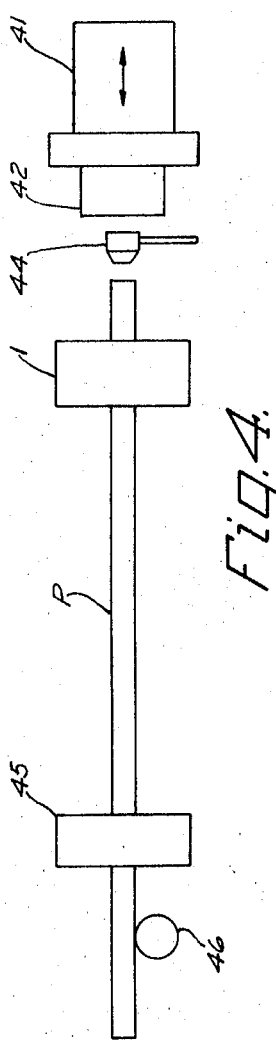
FIG. 4 is a diagrammatic illustration of one manner of use of the chuck.

Referring to FIG. 4, a typical arrangement for the purposes of holding elongated pipe in proper threading position is illustrated. As there illustrated, a threading machine 41 having a rotary tool head 42 is used for the threading operation. The machine is moved axially toward and away from the pipe supporting chucks. One chuck, such as above described, is arranged in front of the tool head 42 for gripping the end of the pipe adjacent the portion to be threaded. A like chuck, indicated at 45, may be arranged at the other end of the pipe. A conventional swinging centering cone 44 is mounted between the head 42, in its retracted position, and the chuck 1. When the pipe P is fed through the chuck 1 it engages the cone and its forward end is centered, regardless of its out-of-roundness or the curvature of its axis endwise.

While the pipe is thus held centered by the cone 44, the jaws 14 of the chuck 1 engage individually on the portion of the pipe which happens to be within the chuck 1 and each jaw is individually adjusted to the external pipe surface it happens to engage without distorting or deflecting such surface, so that the pipe is not squeezed into a round shape if it happens to be oval in cross section, or into an out-of-round shape if it happens to be circular in cross section but has a portion of its circumferential wall weaker than the remainder thereof. The jaws are then moved concurrently and equidistantly into firm clamping engagement. The rear end of the pipe is usually resting on an idler roll 46 during this operation. When the chuck is locked a portion of the pipe near the rear end of the pipe, or remote from the spindle head, assumes whatever position is necessary for accommodation to the centered and gripped position of the forward portion of the pipe. The chuck 45 then is caused to engage this rear portion of the pipe, self-adjust thereto, and then clamp and hold such rear end portion in fixed position while the forward end remains properly centered.

Preferably, the resistance to rotation of the pipe about its axis is provided by the chuck 45 so that, should the gripping force happen to be greatly increased, or the pipe have a weak portion at the part to be threaded, the pipe would not be elastically deformed in cross section at the portion being threaded. Gripping by the chuck 45 eliminates the difficulty often encountered in prior structures in which gripping of the pipe sufficiently firmly adjacent the head to prevent rotation causes elastic deformation at the portion of the pipe at which threading is performed, so that the pipe is in elastically distorted and deformed condition during threading. Consequently, upon release, the pipe self-restores to its normal condition and shape, thus causing the threaded portion to be out-of-round.

Having thus described my invention, I claim:

1. A chuck comprising a body;
a plurality of chuck jaws mounted therein for independent movement relative thereto toward and away from a common axis;
adjusting means to move each of the jaws, independently of the other jaws, relative to the body from a starting position in a direction toward the axis to a new position determined by engagement of the jaw with the surface of a workpiece at the section to be gripped by the jaws;
locking means to temporarily lock each of the jaws independently of the other jaws against return toward starting position in the new position into which it has been moved by the said adjusting means;
power operated means to move all of the jaws concurrently equidistantly toward the axis from their said new positions when the power operated means moves in one direction from a starting position;
means to release the adjusting means and locking means; and means to return the jaws and power operated means to their starting positions, respectively.

2. The structure according to claim 1 wherein the adjusting means are piston and cylinder assemblages for the jaws, respectively,
means to connect all of the assemblages in parallel in a hydraulic pressure fluid circuit, and
valve means are provided to lock each assemblage hydraulically in the position into which it has been moved by hydraulic pressure fluid introduced into it.

3. A self-adjusting chuck comprising:
a chuck body;
a plurality of chuck jaws mounted thereon for movement independently toward and away from a common axis;
independently movable means for the jaws, respectively, and interconnecting the body and jaws for moving each of the jaws toward said axis independently of the other jaws when said means are moved in one direction;
a movable common actuator for said independently movable means for moving them concurrently equidistantly in said one direction when the actuator is moved in a predetermined direction;
means for returning the actuator in the opposite direction;
independently adjustable connectors connecting the actuator with the independently movable means, respectively, and adjustable for moving the independently movable means in said one direction relative to the actuator to predetermined individual positions, respectively;
locking means to lock the connectors temporarily against return from the positions to which they are moved relative to the actuator in moving the independently movable means to said predetermined positions;
means for moving the actuator in said predetermined direction, thereby moving all of the independently operable means concurrently in their said one direction from said positions by way of the locked connectors;
and release means operable for releasing the locking means.

4. The structure according to claim 3 wherein the independently movable means are wedge means;
each connector is an individual piston and cylinder assemblage comprising a piston member and cylinder member; and
the locking means are valves for admitting pressure fluid into the assemblages and for preventing its escape, respectively; and
the release means are operable to open the valves.

5. The structure according to claim 4 wherein the common actuator is a main piston and cylinder assemblage including a main piston and a main cylinder;
one member of each of said individual assemblages is connected to the main piston;
each of said one members has a duct therethrough connecting its associated cylinder member to the main cylinder;
and the valves are check valves disposed in the individual assemblages and arranged to permit flow of pressure fluid into the cylinder members and to block its return flow.

6. The structure according to claim 5 wherein said actuator comprises an annular cylinder coaxial with said common axis and an annular piston therein;
the independently movable means comprise individual movable wedges in the body and complementary wedges on the jaws, respectively;
the connector for each wedge comprises a cylinder bore in the associated wedge and an additional piston carried on the annular piston and reciprocable in said bore;

said annular piston has ducts extending therethrough, and said additional pistons have ducts extending therethrough and connected to ducts in the main piston, respectively, and arranged for discharging into said bores; and each additional piston carries a check valve means which is operable to permit flow of hydraulic fluid from the annular cylinder into the said bore associated with said additional piston, and to prevent the return flow from said associated bore.

7. A self-adjusting chuck comprising:

a body having an axial passage therethrough;

a plurality of gripping jaws mounted therein for movement toward and away from the axis of the passage;

jaw wedge means on the jaws, respectively, individually operable wedge means in the body complementary to the jaw wedge means, respectively, and operative, when moved in one direction, to wedge the jaws toward the axis;

an actuator common to said complementary wedge means for moving them concurrently in said one direction when the actuator is moved in a predetermined direction;

independently extensible and retractible connectors interposed between the actuator and the complementary wedge means, respectively, each for moving its complementary associated wedge means in said one direction independently of the others when the independently extensible and retractible means are extended independently of each other and for transmitting the motion of the actuator in said one direction to the complementary wedge means while the extensible and retractible means each remain in an extended condition;

means for extending the extensible and retractible means independently of each other;

means for temporarily locking the extensible and retractible means against return from their respective extended positions;

means for moving the actuator in said predetermined direction so as to move said extensible and retractible means, concurrently, while in their extended conditions, respectively, in a direction to move the complementary wedge means in said one direction;

and means for releasing said extensible and retractible means upon movement of the actuator in a direction opposite from said predetermined direction.

References Cited

UNITED STATES PATENTS

| | | | |
|---|---|---|---|
| 2,993,701 | 7/1961 | Arnold | 279—114 |
| 3,151,871 | 10/1964 | Multer | 279—1 |
| 3,241,847 | 3/1966 | McConnell | 279—4 |
| 1,469,360 | 10/1923 | Cullen | 279—4 |
| 3,076,662 | 2/1963 | Kostyrka | 279—4 |
| 3,083,024 | 3/1963 | Herbkersman | 279—4 |
| 3,153,250 | 10/1964 | Muehlhauser | 10—89 |

ROBERT C. RIORDON, Primary Examiner

J. C. PETERS, Assistant Examiner

U.S. Cl. X.R.

279—121